United States Patent
Kumar et al.

(10) Patent No.: US 10,116,807 B2
(45) Date of Patent: Oct. 30, 2018

(54) METHOD AND APPARATUS FOR MANAGING SUBSCRIPTION TO POLICY COUNTERS

(71) Applicant: Telefonaktiebolaget LM Ericsson (publ), Stockholm (SE)

(72) Inventors: R. Kumar, Chennai (IN); Rameshwaran Thulasidoss, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/735,350

(22) PCT Filed: Jun. 12, 2015

(86) PCT No.: PCT/IN2015/050046
§ 371 (c)(1),
(2) Date: Dec. 11, 2017

(87) PCT Pub. No.: WO2016/199159
PCT Pub. Date: Dec. 15, 2016

(65) Prior Publication Data
US 2018/0176389 A1    Jun. 21, 2018

(51) Int. Cl.
*H04M 15/00* (2006.01)
*H04L 12/14* (2006.01)
*H04W 4/24* (2018.01)

(52) U.S. Cl.
CPC ........ *H04M 15/66* (2013.01); *H04L 12/1407* (2013.01); *H04M 15/64* (2013.01); *H04M 15/8228* (2013.01); *H04W 4/24* (2013.01)

(58) Field of Classification Search
CPC ............. H04L 12/1407; H04L 12/1467; H04L 41/0893; H04M 15/66; H04M 15/64; H04M 15/8228; H04M 15/886; H04W 4/24
See application file for complete search history.

(56) References Cited

U.S. PATENT DOCUMENTS

| 5,864,830 A | 1/1999 | Armetta et al. |
| 5,914,472 A | 6/1999 | Foladare et al. |

(Continued)

OTHER PUBLICATIONS

ETSI, "Digital cellular telecommunications system (Phase 2+); Universal Mobile Telecommunications System (UMTS); LTE; Policy and charging control: Spending limit reporting over Sy reference point (3GPP TS 29.219 version 12.2.0 Release 12)", ETSI TS 129 219 V12.2.0, Oct. 2014, 1-24.

*Primary Examiner* — Nam Huynh
(74) *Attorney, Agent, or Firm* — Murphy, Bilak & Homiller, PLLC

(57) ABSTRACT

A method, performed in a Policy and Charging Rules Function (PCRF), for managing subscription to policy counters maintained at an Online Charging System (OCS) is disclosed. The PCRF is operable to communicate with the OCS over an Sy reference. The method comprises receiving a Multiple Users subscription trigger from a network operator (202), the Multiple Users subscription trigger identifying a reference network policy and a subject network policy. The method further comprises sending a Spending Limit Request (SLR) command to the OCS (214), the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy. Also disclosed is a method, (Continued)

performed in an OCS, for managing subscription by a PCRF to policy counters maintained at the OCS. The method comprises receiving an SLR command from the PCRF (302), the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy. The method also comprises applying the received SLR command with respect to the subject policy counter to each ongoing Sy session between the OCS and the PCRF which already includes a subscription to a policy counter for the reference network policy (304-322). Also disclosed are a PCRF, an OCS and a computer program product.

15 Claims, 7 Drawing Sheets

(56) References Cited

U.S. PATENT DOCUMENTS

| | | | |
|---|---|---|---|
| 9,332,135 B1 * | 5/2016 | Foottit | H04L 12/1407 |
| 2014/0066004 A1 * | 3/2014 | Shaik | H04L 12/1407 |
| | | | 455/406 |
| 2014/0335815 A1 * | 11/2014 | Ephraim | H04M 15/886 |
| | | | 455/406 |

* cited by examiner

US 10,116,807 B2

METHOD AND APPARATUS FOR MANAGING SUBSCRIPTION TO POLICY COUNTERS

TECHNICAL FIELD

The present invention relates to a method and apparatus for managing subscription to policy counters maintained at an Online Charging System. The present invention also relates to a computer program product configured, when run on a computer, to carry out a method for managing subscription to policy counters.

BACKGROUND

Within a 3GPP communication network, a Policy and Charging Rules Function (PCRF) supports the creation of rules and makes policy decisions for subscribers to the network. One of the functions of the PCRF is to make policy decisions for subscribers based on individual subscriber spending limits. An Online Charging System (OCS) maintains real-time policy counters for subscribers, and the status of these counters is used by the PCRF as input to policy decisions.

The Sy reference point is located between the PCRF and the OCS, and enables transfer of policy counter status information relating to subscriber spending from the OCS to the PCRF. The Sy reference point is illustrated in FIG. 1, which demonstrates relationships between different functional entities in a reference network architecture 100. The Sy reference point is specified in 3GPP Technical Specification 29.219 and supports the following functions:

Request from the PCRF to the OCS for policy counter status reporting.

Subscription/un-subscription by the PCRF to/from notifications from the OCS of policy counter status changes.

Notification of spending limit reports from the OCS to the PCRF.

When the status of policy counters is first required by the PCRF to make a policy decision for a network user, the PCRF uses an Initial Spending Limit Report Request procedure. The PCRF may request one or more specific policy counter statuses for the network user, or may request all policy counter statuses to be reported by the OCS for the user. The OCS then provides the status to the PCRF of the requested policy counters, and will notify the PCRF of any changes in the status of those policy counters.

The PCRF may request reporting for a specific policy counter or counters to which it is not currently subscribed, and/or may cancel reporting for specific policy counter statuses using an Intermediate Spending Limit Report Request. The PCRF may cancel spending limit reporting for all policy counters for a user via a Final Spending Limit Report Request.

An Sy session between the PCRF and OCS is initiated when an Initial Spending Limit Report Request is issued by the PCRF for a user. The Sy session is terminated when a Final Spending Limit Report Request is issued by the PCRF for the user. Each spending limit report request is specific to a particular Sy session. Occasionally, circumstances may require a PCRF to add or remove subscription to one or more policy counters for multiple ongoing Sy sessions at the same time. This may be the case for example in the event of a promotional offer that applies to multiple customers. In such circumstances, the issuance of multiple Intermediate Spending Limit Report Requests, one for the Sy session of each subscriber affected by the offer, leads to a signalling burst between the PCRF and the OCS which may be detrimental to overall network performance.

SUMMARY

It is an aim of the present invention to provide a method and apparatus which obviate or reduce at least one or more of the disadvantages mentioned above.

According to an aspect of the present invention, there is provided a method, performed in a Policy and Charging Rules Function (PCRF), for managing subscription to policy counters maintained at an Online Charging System (OCS), wherein the PCRF is operable to communicate with the OCS over an Sy reference point. The method comprises receiving a Multiple Users subscription trigger from a network operator, the Multiple Users subscription trigger identifying a reference network policy and a subject network policy, and sending a Spending Limit Request (SLR) command to the OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy.

According to different examples of the invention, the PCRF and OCS may be in the same or different Home Public Land Mobile Networks (HPLMNs).

According to examples of the invention, the Multiple Users subscription trigger may identify a plurality of reference network policies. The addition or removal of a subject policy or policies for users may be dependent upon an exiting subscription to one or more of the reference polices. The Multiple Users subscription trigger may specify whether the trigger applies to users having an existing subscription to any one of the reference policies or to users having an existing subscription to all of the reference policies. In such examples, the SLR command may specify a plurality of reference policies.

According to examples of the invention, the Multiple Users subscription trigger may identify a plurality of subject network policies. In such examples, the SLR command may specify an identifier of a policy counter for each of the subject network policies.

According to examples of the invention, the method may further comprise receiving a Spending Limit Answer (SLA) from the OCS, the SLA confirming application of the SLR command with respect to the subject policy counter to all ongoing Sy sessions between the PCRF and the OCS which already included a subscription to a policy counter for the reference network policy.

According to examples of the invention, the method may further comprise updating an internal record for each ongoing Sy session between the PCRF and the OCS including a subscription to a policy counter for the reference network policy with application of the SLR command with respect to the subject policy counter.

According to examples of the invention, updating an internal record for each ongoing Sy session between the PCRF and the OCS including a subscription to a policy counter for the reference network policy with application of the SLR command with respect to the subject policy counter may comprise, for each ongoing Sy session between the PCRF and the OCS including a subscription to a policy counter for the reference network policy, performing one of adding or removing the identifier of the subject policy counter to or from a list of policy counter identifiers for which the PCRF will receive status update notifications from the OCS for that Sy session.

According to examples of the invention, specifying application of the SLR command with respect to the subject policy counter to all ongoing Sy sessions between the PCRF and the OCS which already include a subscription to a policy counter for the reference network policy may comprise setting a Spending Limit Request Type Attribute Value Pair (AVP) of the SLR command to INTERMEDIATE_REQUEST, including a Reference Policy Counter Identifier AVP in the SLR command, and setting the Reference Policy Counter Identifier AVP to be an identifier of the policy counter for the reference network policy.

According to examples of the invention, specifying application of the SLR command with respect to the subject policy counter to all ongoing Sy sessions between the PCRF and the OCS which already include a subscription to a policy counter for the reference network policy may comprise specifying one of addition or removal of the subject policy counter for the subject network policy. In some examples of the invention, specifying addition of the subject policy counter may comprise including an Action Type AVP in the SLR command and setting a value of the Action Type AVP to subscribe; and specifying removal of the subject policy counter may comprise including an Action Type AVP in the SLR command and setting a value of the Action Type AVP to unsubscribe.

According to examples of the invention, the Multiple Users subscription trigger may specify one of provision or removal of the subject network policy. If the Multiple Users subscription trigger specifies provision of the subject network policy, specifying application of the SLR command with respect to the subject policy counter to all ongoing Sy sessions between the PCRF and the OCS which already include a subscription to a policy counter for the reference network policy may comprise specifying addition of the subject policy counter for the subject network policy. If the Multiple Users subscription trigger specifies removal of the identified network policy, specifying application of the SLR command with respect to the subject policy counter to all ongoing Sy sessions between the PCRF and the OCS which already include a subscription to a policy counter for the reference network policy may comprise specifying removal of the subject policy counter for the subject network policy.

According to examples of the invention, if the Multiple Users subscription trigger identifies a plurality of reference network policies, specifying application of the SLR command with respect to the subject policy counter to all ongoing Sy sessions between the PCRF and the OCS which already include a subscription to a policy counter for the reference network policy may comprise including identifiers for the plurality of reference network policies and including a Condition AVP in the SLR command, and setting a value of the Condition AVP to at least one of AND or OR.

According to another aspect of the present invention, there is provided a method, performed in an Online Charging System (OCS), for managing subscription by a Policy and Charging Rules Function (PCRF) to policy counters maintained at the OCS, wherein the OCS is operable to communicate with the PCRF over an Sy reference point. The method comprises receiving a Spending Limit Request (SLR) command from the PCRF, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy. The method further comprises applying the received SLR command with respect to the subject policy counter to each ongoing Sy session between the OCS and the PCRF which already includes a subscription to a policy counter for the reference network policy.

According to examples of the invention, the method may further comprise sending a Spending Limit Answer (SLA) to the PCRF, the SLA confirming application of the SLR with respect to the subject policy counter to all ongoing Sy sessions between the PCRF and the OCS which already included a subscription to a policy counter for the reference network policy.

According to examples of the invention, a Spending Limit Request Type Attribute Value Pair (AVP), of the SLR command may be set to INTERMEDIATE_REQUEST, the SLR command may include a Reference Policy Counter Identifier AVP, and the Reference Policy Counter Identifier AVP may be set to be an identifier of the policy counter for the reference network policy.

According to examples of the invention, applying the received SLR command with respect to the subject policy counter to each ongoing Sy session between the OCS and the PCRF which already includes a subscription to a policy counter for the reference network policy may comprise, for each ongoing Sy session between the OCS and the PCRF, checking whether the reference policy counter identifier is present in an Sy session list of policy counter identifiers for which status update notifications are to be sent to the PCRF for that Sy session, and, if the reference policy counter identifier is present in the Sy session list, performing one of adding or removing the subject policy counter identifier to the Sy session list, and, if the reference policy counter identifier is not present in the Sy session list, making no change to the Sy session list.

According to examples of the invention, applying the received SLR command with respect to the subject policy counter to each ongoing Sy session between the OCS and the PCRF which already includes a subscription to a policy counter for the reference network policy may further comprise checking a value of an Action Type AVP included in the SLR command.

According to examples of the invention, the SLR command may specify policy counters for a plurality of reference network policies, and may specify a condition for application of the SLR command, the condition being a subscription to at least one or to all of the specified reference network policies. The condition may be specified via a Condition AVP. In such examples, applying the received SLR command with respect to the subject policy counter to each ongoing Sy session between the OCS and the PCRF which already includes a subscription to a policy counter for the reference network policy may comprise checking a condition for application of the SLR command.

According to examples of the invention, the method may further comprise, if the SLR command specifies addition of the subject policy counter for the subject network policy, for each ongoing Sy session between the OCS and the PCRF, if the reference policy counter identifier is present in the Sy session list, checking whether the subject policy counter identifier is already present in the Sy session list, and if the subject policy counter identifier is already present in the Sy session list, making no change to the list, and if the subject policy counter identifier is not already present in the Sy session list, adding the subject policy counter identifier to the Sy session list.

According to examples of the invention, the method may further comprise, if the SLR command specifies removal of the subject policy counter for the subject network policy, for each ongoing Sy session between the OCS and the PCRF, if the reference policy counter identifier is present in the Sy session list, checking whether the subject policy counter identifier is present in the Sy session list, and if the subject policy counter identifier is present in the Sy session list, removing the subject policy counter identifier, and if the subject policy counter identifier is not present in the Sy session list, making no change to the list.

According to another aspect of the present invention, there is provided a computer program product configured, when run on a computer, to carry out a method according to the first or second aspects of the present invention.

According to another aspect of the present invention, there is provided a Policy and Charging Rules Function (PCRF) for managing subscription to policy counters maintained at an Online Charging System (OCS), wherein the PCRF is operable to communicate with the OCS over an Sy reference point, the PCRF comprising a processor and a memory, the memory containing instructions executable by the processor such that the PCRF is operable to carry out a method according to the first aspect of the present invention.

According to another aspect of the present invention, there is provided an Online Charging System (OCS) for managing subscription by a Policy and Charging Rules Function (PCRF) to policy counters maintained at the OCS, wherein the OCS is operable to communicate with the PCRF over an Sy reference point, the OCS comprising a processor and a memory, the memory containing instructions executable by the processor such that the OCS is operable to carry out a method according to the second aspect of the present invention.

According to another aspect of the present invention, there is provided a Policy and Charging Rules Function (PCRF) for managing subscription to policy counters maintained at an Online Charging System (OCS), wherein the PCRF is operable to communicate with the OCS over an Sy reference point. The PCRF comprises a subscription trigger unit configured to receive a Multiple Users subscription trigger from a network operator, the Multiple Users subscription trigger identifying a reference network policy and a subject network policy. The PCRF further comprises a Spending Limit Request unit configured to send a Spending Limit Request (SLR) command to the OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy.

According to examples of the invention, the Multiple Users subscription trigger may identify a plurality of reference network policies. The addition or removal of a subject policy or policies for users may be dependent upon an exiting subscription to one or more of the reference polices. The Multiple Users subscription trigger may specify whether the trigger applies to users having an existing subscription to any one of the reference policies or to users having an existing subscription to all of the reference policies. In such examples, the Spending Limit Request unit may be configured to send an SLR command specifying a plurality of reference policies.

According to examples of the invention, the Spending Limit Request unit may be further configured to receive a Spending Limit Answer (SLA) from the OCS, the SLA confirming application of the SLR command with respect to the subject policy counter to all ongoing Sy sessions between the PCRF and the OCS which already included a subscription to a policy counter for the reference network policy.

According to examples of the invention, the PCRF may further comprise a record unit configured to update an internal record for each ongoing Sy session between the PCRF and the OCS including a subscription to a policy counter for the reference network policy with application of the SLR command with respect to the subject policy counter.

According to examples of the invention, the record unit may be configured to update an internal record for each ongoing Sy session between the PCRF and the OCS including a subscription to a policy counter for the reference network policy with application of the SLR command with respect to the subject policy counter by, for each ongoing Sy session between the PCRF and the OCS including a subscription to a policy counter for the reference network policy, performing one of adding or removing the policy counter identifier of the subject policy counter to or from a list of policy counter identifiers for which the PCRF will receive status update notifications from the OCS for that Sy session.

According to examples of the invention, the Spending Limit Request unit may be configured to specify application of the SLR command with respect to the subject policy counter to all ongoing Sy sessions between the PCRF and the OCS which already include a subscription to a policy counter for the reference network policy by setting a Spending Limit Request Type Attribute Value Pair (AVP) of the SLR command to INTERMEDIATE_REQUEST, including a Reference Policy Counter Identifier AVP in the SLR command, and setting the Reference Policy Counter Identifier AVP to be an identifier of the policy counter for the reference network policy.

According to examples of the invention, the Spending Limit Request unit may be further configured to specify application of the SLR command with respect to the subject policy counter to all ongoing Sy sessions between the PCRF and the OCS which already include a subscription to a policy counter for the reference network policy by specifying one of addition or removal of the subject policy counter for the subject network policy. In some examples of the invention, the Spending Limit Request unit may be configured to specify addition of the subject policy counter by including an Action Type AVP in the SLR command and setting a value of the Action Type AVP to subscribe. The Spending Limit Request unit may be configured to specify removal of the subject policy counter by including an Action Type AVP in the SLR command and setting a value of the Action Type AVP to unsubscribe.

According to examples of the invention, the subscription trigger unit may be configured to receive a Multiple Users subscription trigger specifying one of provision or removal of the subject network policy. If the Multiple Users subscription trigger specifies provision of the identified network policy, the Spending Limit Request unit may be configured to specify application of the SLR command with respect to the subject policy counter to all ongoing Sy sessions between the PCRF and the OCS which already include a subscription to a policy counter for the reference network policy by specifying addition of the subject policy counter for the subject network policy. If the Multiple Users subscription trigger specifies removal of the identified network policy, the Spending Limit Request unit may be configured to specify application of the SLR command with respect to the subject policy counter to all ongoing Sy sessions between the PCRF and the OCS which already include a subscription to a policy counter for the reference network policy by specifying removal of the subject policy counter for the subject network policy.

According to examples of the invention, if the Multiple Users subscription trigger identifies a plurality of reference network policies, the Spending Limit Request unit may be configured to specify application of the SLR command with respect to the subject policy counter to all ongoing Sy sessions between the PCRF and the OCS which already include a subscription to a policy counter for the reference network policy by including identifiers for the plurality of reference network policies in the SLR command and including a Condition AVP in the SLR command, and setting a value of the Condition AVP to at least one of AND or OR.

According to another aspect of the present invention, there is provided an Online Charging System (OCS) for managing subscription by a Policy and Charging Rules Function (PCRF) to policy counters maintained at the OCS, wherein the OCS is operable to communicate with the PCRF over an Sy reference point. The OCS comprises a Spending Limit Request unit configured to receive a Spending Limit Request (SLR) command from the PCRF, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy. The OCS further comprises an application unit configured to apply the received SLR command with respect to the subject policy counter to each ongoing Sy session between the OCS and the PCRF which already includes a subscription to a policy counter for the reference network policy.

According to examples of the invention, the Spending Limit Request unit may be further configured to send a Spending Limit Answer (SLA) to the PCRF, the SLA confirming application of the SLR with respect to the subject policy counter to all ongoing Sy sessions between the PCRF and the OCS which already included a subscription to a policy counter for the reference network policy.

According to examples of the invention, the Spending Limit Request unit may be configured to receive an SLR command in which a Spending Limit Request Type Attribute Value Pair (AVP) of the SLR command is set to INTERMEDIATE_REQUEST, the SLR command including a Reference Policy Counter Identifier AVP, and in which the Reference Policy Counter Identifier AVP is set to be an identifier of the policy counter for the reference network policy.

According to examples of the invention, the application unit may comprise a checking unit and an updating unit and, for each ongoing Sy session between the OCS and the PCRF, the checking unit may be configured to check whether the reference policy counter identifier is present in an Sy session list of policy counter identifiers for which status update notifications are to be sent to the PCRF for that Sy session. If the reference policy counter identifier is present in the Sy session list, the updating unit may be configured to perform one of adding or removing the subject policy counter identifier to or from the Sy session list, and if the reference policy counter identifier is not present in the Sy session list, the updating unit may be configured to make no change to the Sy session list.

According to examples of the invention, the application unit may be further configured to check a value of an Action Type AVP in the SLR command.

According to examples of the invention, the SLR command may specify policy counters for a plurality of reference network policies, and may specify a condition for application of the SLR command, the condition being a subscription to at least one or to all of the specified reference network policies. The condition may be specified via a Condition AVP. In such examples, the application unit may be further configured to check a condition for application of the SLR command, and the checking unit may be configured to check whether any one or all of the reference policy counter identifiers are present in an Sy session list of policy counter identifiers for which status update notifications are to be sent to the PCRF for that Sy session.

According to examples of the invention, if the Spending Limit Request Unit receives an SLR command specifying addition of the subject policy counter for the subject network policy, for each ongoing Sy session between the OCS and the PCRF, if the reference policy counter identifier is present in the Sy session list, the checking unit may be further configured to check whether the subject policy counter identifier is already present in the Sy session list. If the subject policy counter identifier is already present in the Sy session list, the updating unit may be configured to make no change to the list, and if the subject policy counter identifier is not already present in the Sy session list, the updating unit may be configured to add the subject policy counter identifier to the Sy session list.

According to examples of the invention, if the Spending Limit Request Unit receives an SLR command specifying removal of the subject policy counter for the subject network policy, for each ongoing Sy session between the OCS and the PCRF, if the reference policy counter identifier is present in the Sy session list, the checking unit may be further configured to check whether the subject policy counter identifier is present in the Sy session list. If the subject policy counter identifier is present in the Sy session list, the updating unit may be configured to remove the subject policy counter identifier from the list, and if the subject policy counter identifier is not present in the Sy session list, the updating unit may be configured to make no change to the list.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
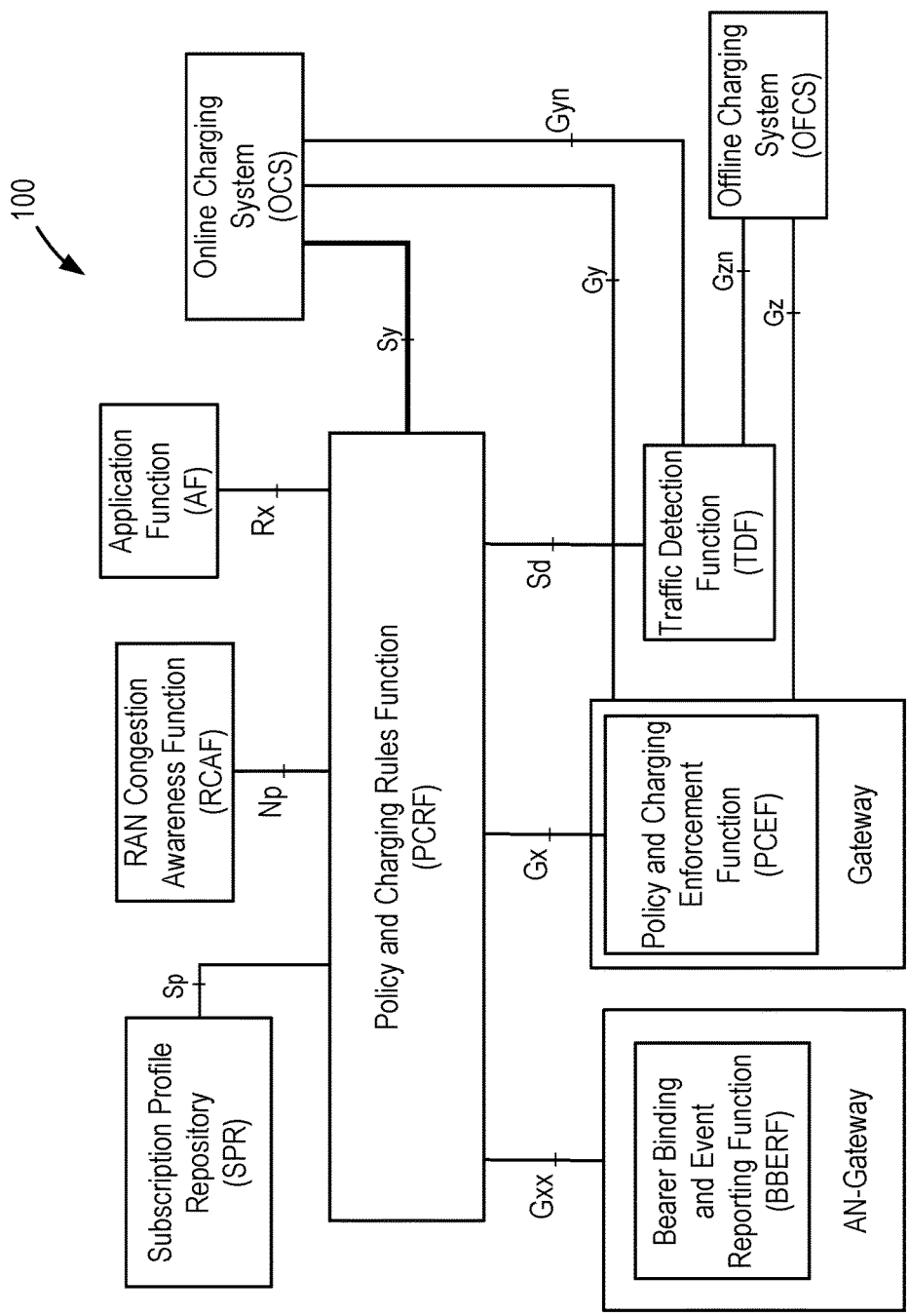
FIG. 1 is a representation of a reference network architecture.

Aspects of the present invention provide methods, performed at a PCRF and an OCS, which enable subscription or un-subscription to/from one or more policy counters for multiple ongoing Sy sessions between the PCRF and OCS using a single signalling request. A subscription trigger is received by the PCRF which specifies actions relating to one or more subject network policies that should apply to multiple network users, as opposed to just a single user as is the case in existing protocols. The multiple users are identified by already having an existing subscription to a reference network policy, which is also identified by the subscription trigger. In some examples, the multiple users may be identified by an existing subscription to a plurality of reference network policies, or to at least one of the plurality of reference network policies. The PCRF then sends a Spending Limit Request (SLR) command which identifies the subject policy counter or counters and applies to all ongoing Sy sessions which already include a subscription to a policy counter for the reference network policy or policies. The OCS cooperates with the PCRF to enable the PCRF to subscribe or unsubscribe to/from the subject policy counter or counters for ongoing Sy sessions including an existing subscription to the reference network policy counter or counters as a consequence of receiving the single SLR command. Together the PCRF and OCS thus enable the bulk subscription or un-subscription to/from a subject policy counter or counters for multiple ongoing Sy sessions using a single SLR command, avoiding the signalling burst that is otherwise caused if an individual SLR command must be sent for each ongoing Sy session of the group of ongoing Sy sessions to be updated.

Examples of the present invention provide the above discussed functionality by introducing a new Attribute Value Pair (AVP) to the SLR command as specified in TS 29.219. The new AVP may be added when the SLR command type is INTERMEDIATE_REQUEST. The new AVP enables the PCRF to specify one or more reference network policy counters, such that the SLR command is applied to all Sy sessions that include a subscription to the reference network policy counter, to all reference network policy counters, or to at least one of the reference network policy counters. The new AVP is thus classed as an optional AVP, which may or may not be included in an Intermediate type SLR command depending upon the nature of the subscription trigger which triggered the sending of the SLR command.

The new AVP is in some examples referred to as "Reference-Policy-Counter-Identifier" and may be used as follows. The Reference-Policy-Counter-Identifier is included into SLR commands of type Intermediate when the PCRF receives a trigger from a network operator which applies to all users already having a subscription to a certain network policy, referred to as a reference network policy. Under such circumstances, the SLR command type AVP is set to INTERMEDIATE_REQUEST and the Reference-Policy-Counter-Identifier AVP is included in the SLR command, with a value set to be the identifier of the policy counter for the reference network policy. One or more "Policy-Counter-Identifier" AVP values should then also be included in the SLR command, indicating the subject network policy or policies which are to be added or removed to all Sy sessions that already include a subscription to the reference network policy. As the SLR command applies to all ongoing Sy sessions that already have a subscription to the reference network policy, a Subscription-ID AVP is Optional, and need not be sent in the SLR command. If a subscription-ID is sent with the SLR command, it will be ignored by the OCS.

The effect of the new AVP is to enable subscription to new subject network policies for multiple users with a single SLR command. This may be appropriate for example in a business context in which a network operator wishes to upgrade all subscribers having a level 1 subscription plan to a level 2 subscription plan using an Add-On voucher. If a network policy corresponding to a level 1 subscription plan is set as the reference network policy, then subscription for all users currently on a level 1 plan to a network policy or policies corresponding to a level 2 plan can be achieved by sending a single SLR command with the identifier for the level 1 plan policy as the value for the Reference-Policy-Counter-Identifier.

As discussed above, the Reference-Policy-Counter-Identifier AVP may be a multiple occurrence AVP, with the possibility to include more than one reference policy counter identifier. Another new AVP may be introduced to specify whether the SLR command is to be applied only to users having a subscription to all of the reference network policy identifiers or to users having a subscription to at least one of the reference network policy identifiers. The additional new AVP may be referred to as "Condition" AVP. The Condition AVP may be included when the Reference-Policy-Counter-Identifier AVP is present, or only when the Reference-Policy-Counter-Identifier AVP is multiple occurrence. The Condition AVP may have a value set to AND, OR etc. A Condition AVP of value AND may specify that the SLR command applies only to those users including an existing subscription to all of the included reference network policies. A Condition AVP value of OR may specify that the SLR command applies to users including an existing subscription to any one of the included reference network policies.

The above discussion refers to subscription to new subject network policies for multiple users with a single SLR command. In some examples, it may also be desirable to un-subscribe from subject network policies for multiple users with a single network command. For this purpose another new AVP may be introduced to specify whether the SLR command is instructing subscription to or un-subscription from the subject network policy or policies. The new AVP may be referred to as "Action Type" AVP and may be included in an SLR command when the Reference-Policy-Counter-Identifier AVP is present. The value of the Action Type AVP may indicate whether subscription or unsubscription is requires, with for example an Action Type value of 0 indicating subscribe and an Action Type value of 1 indicating un-subscribe.

Behavior of the PCRF according to aspects of the present invention is discussed below with reference to FIG. 2. In brief, the PCRF makes use of the new reference policy counter AVP when it receives a trigger that applies to multiple ongoing Sy sessions. The trigger may indicate one or more subject policy counters, and while it is envisaged that in a majority of cases the trigger will indicate subscription to the subject counter or counters, it is also possible that the trigger may indicate un-subscription from the subject counter or counters as discussed above. For both multiple subscription and multiple un-subscription, the PCRF sets the SLR command type to INTERMEDIATE_REQUEST and sets the Reference-Policy-Counter-Identifier AVP to be the policy counter identifier of the reference network policy indicated in the trigger. In the case of multiple reference network policies, the Condition AVP is also included and set to an appropriate value. The subject policies to be added or removed are also included in the SLR command, as may be the Action AVP, indicating addition or removal of the subject network policy or policies. Internally, the PCRF handles the multiple subscription or un-subscription to/from a policy counter or counters by iterating through each of its ongoing Sy sessions, checking for the reference policy counter identifier or counters in the session list and, for each Sy session for which the, all or one of reference policy counter identifier or identifiers is/are present, treating the session as if subscription or un-subscription had been triggered for that session individually, and requested using an INTERMEDIATE_REQUEST SLR command without the new AVP. No new session is created for the multiple subscription procedure, as each multiple command is internally mapped to ongoing Sy sessions. The initiation and termination of Sy sessions using Initial and Final SLR commands is unchanged.

Figure 2:
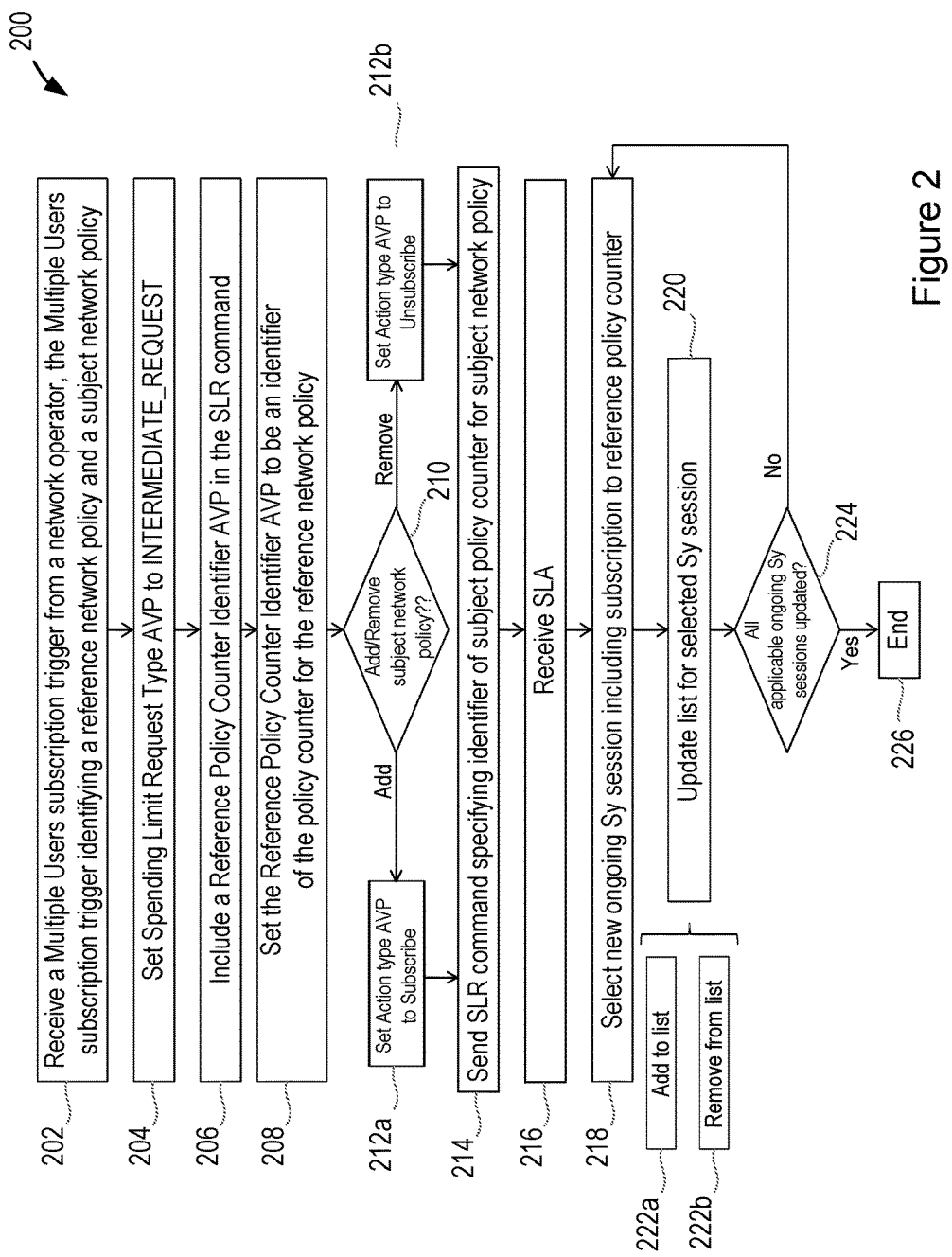
FIG. 2 is a flow chart illustrating process steps in a method, performed in a PCRF, for managing subscription to policy counters maintained at an OCS.

FIG. 2 is a flow chart illustrating process steps in an example method 200 performed at a PCRF for managing subscription to policy counters maintained at an OCS. The method 200 includes the step of receiving a Multiple Users subscription trigger from a network operator in step 202, the Multiple Users subscription trigger identifying a reference network policy and a subject network policy. The method 200 also includes the step 214 of sending an SLR command to the OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy. The method 200 may also include additional steps, as set out below. In the description below, a process flow involving a single reference network policy is described for simplicity. However, it will be appreciated that the process flow for multiple reference network policies follows a similar pattern, with the addition of a Condition AVP in the SLR command and appropriate checks for the presence of at least one or multiple reference network policies when updating Sy sessions with application of the SLR command.

Referring to FIG. 2, in a first step 202, the PCRF receives a Multiple Users subscription trigger from a network operator. This trigger indicates that it applies to all network users having an existing subscription to a reference network policy, in contrast to existing subscription triggers that apply to a specific user. The Multiple Users subscription trigger identifies at least one reference network policy, which indicates the users to which the trigger applies, and identifies at least one subject network policy. As discussed above, the Multiple Users trigger may identify several subject network policies and several reference network policies. On receipt of the Multiple Users subscription trigger, the PCRF then sets a Spending Limit Request Type AVP of an SLR command to INTERMEDIATE_REQUEST in step 204 and includes a Reference-Policy-Counter-Identifier AVP in the SLR command at step 206. In step 208, the PCRF sets the Reference-Policy-Counter-Identifier AVP value to be the identifier of the policy counter for the reference network policy identified in the received Multiple Users trigger from step 202. In the case of multiple reference network policies, the PCRF also includes a Condition AVP in the SLR and sets the value of the Condition AVP according to an indication in the received Multiple Users subscription trigger. In step 210, the PCRF then determines whether the received Multiple Users trigger indicates provision or removal of the subject policy or policies, includes an Action Type AVP in the SLR and sets the Action Type AVP to subscribe or unsubscribe as appropriate, in step 212a or 212b. The PCRF then sends the SLR command to its cooperating OCS in step 214, including in the SLR command a policy counter identifier for the or each of the subject network policies specified in the Multiple Users subscription trigger, in addition to the reference policy counter identifier. In step 216, the PCRF receives an SLA from the OCS, confirming that the requested action has been taken. The PCRF then proceeds to internally map the SLR command sent to the OCS to each of the existing Sy sessions between the PCRF and the OCS which already includes a subscription to a policy counter for the reference network policy. In step 218, the PCRF selects an ongoing Sy session which already included a subscription to the reference policy counter. In step 220, the PCRF updates a list of policy counters for which updates are to be received for the selected Sy session with the subject policy counter or counters. This may involve adding subject policy counter or counters to the list in step 222a or removing subject policy counter or counters from the list in step 222b, depending on the specification in the received Multiple Users trigger regarding addition or removal of the subject policy or policies. In step 224, the PCRF checks whether it has updated its internal lists of all applicable ongoing Sy sessions; that is all ongoing Sy sessions having a subscription to the reference network policy counter. If all applicable ongoing Sy sessions have not yet been updated, the PCRF returns to step 218 to select a new Sy session and update the session list. When all applicable ongoing Sy sessions have been updated, the process terminates at step 226. In the case of multiple reference network policies, the step 218 may involve selecting an ongoing Sy session which already included a subscription to at least one of reference policy counters or to all of the reference policy counters.

Figure 3:
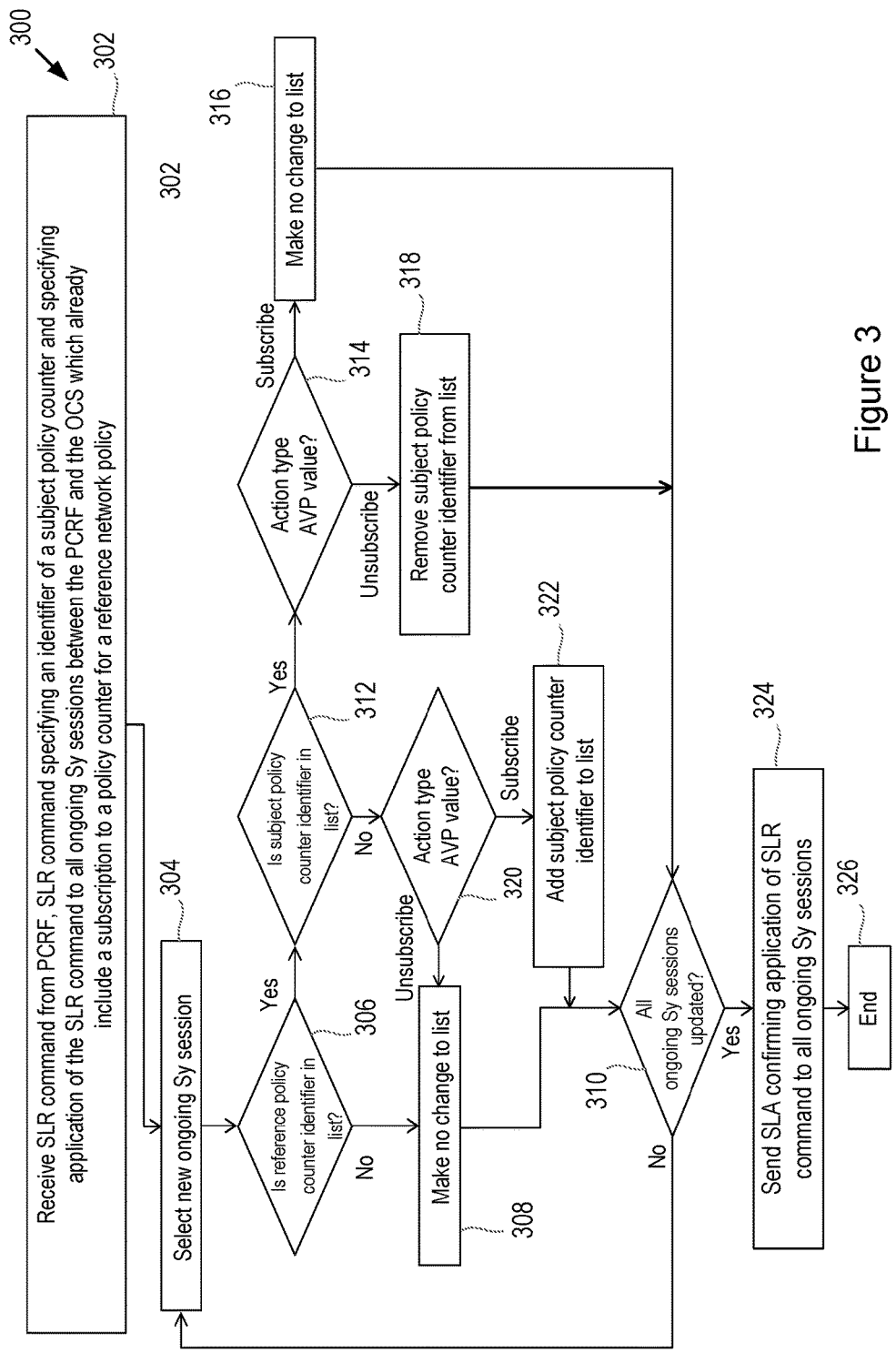
FIG. 3 is a flow chart illustrating process steps in another method, performed in an OCS, for managing subscription to policy counters maintained at an OCS.

Behavior of the OCS according to examples of the invention is now described, with reference to FIG. 3. In brief, when the OCS receives an SLR command with the SLR type INTERMEDIATE_REQUEST and a Reference-Policy-Counter-Identifier AVP present, the OCS updates the Policy Counter Identifier list for all ongoing Sy sessions having a subscription to the reference network policy counter by adding or removing the newly received subject policy counter identifier or identifiers to or from each list. In the case of multiple reference policy counters, the OCS checks a Condition AVP to know whether the SLR command is to apply to Sy sessions including a subscription to any one of the reference network policies or only to Sy sessions including subscription to all of the reference network policies. The OCS handles this multiple subscription/un-subscription to/from policy counters by internally iterating through each ongoing session. A multiple SLR command is thus treated as multiple individual INTERMEDIATE_REQUEST commands. It will be appreciated that the OCS merely adds or removes subject policy counter identifiers included in the multiple SLR command, and does not change any other existing entries in the policy counter identifier list for each ongoing Sy session affected by the command. The OCS determines whether to add or remove the subject network policy counter identifier or identifiers by checking an Action Type AVP included in the SLR command.

When the OCS receives an SLR command with the SLR type INTERMEDIATE_REQUEST and a Reference-Policy-Counter-Identifier AVP present, the OCS deals with exceptional circumstances such as 'Not Applicable to Subscriber' or 'Unknown Counter Identifier' in the same way as it deals with these circumstances for a standard INTERMEDIATE_REQUEST without a Reference-Policy-Counter-Identifier AVP present. When the OCS receives an SLR command with the SLR type INTERMEDIATE_REQUEST, a Reference-Policy-Counter-Identifier AVP present, and a specification to remove the subject policy counter identifier or identifiers, for example via an Action Type AVP set to un-subscribe, if any of the applicable sessions do not have the subject policy counter identifier or identifiers in the list, the OCS simply ignores that session and continues with the next session. This may be the case for example if that particular policy counter identifier has never been added for a particular user, or has already been removed for that user via another Intermediate request. No new Sy session is created or maintained by the OCS to manage an SLR command with the new AVP, as the SLR command is internally mapped by the OCS to existing Sy sessions. The procedure for initiating and terminating Sy sessions using Initial and Final SLR commands also remains unchanged.

FIG. 3 is a flow chart illustrating process steps in an example method 300 performed at an OCS for managing subscription by a PCRF to policy counters maintained at the OCS. The method 300 includes the step of receiving an SLR command from the PCRF at step 302, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy. The method 300 also includes the step of applying the received SLR command with respect to the subject policy counter to each ongoing Sy session between the OCS and the PCRF which already includes a subscription to a policy counter for the reference network policy at steps 304 to 322. The method 300 may also include additional steps, as set out below. As in the case of FIG. 2 described above, in the description of FIG. 3 below, a process flow involving a single reference network policy is described for simplicity. However, it will be appreciated that the process flow for multiple reference network policies follows a similar pattern, with the addition of a Condition AVP in the SLR command and appropriate checks for the presence of at least one or multiple reference network policies when applying the SLR command.

Referring to FIG. 3, in a first step 302, the OCS receives an SLR command from the PCRF. The SLR command specifies an identifier of a subject policy counter for a subject network policy and specifies application of the SLR command with respect to the subject policy counter to all ongoing Sy sessions between the PCRF and the OCS which already include a subscription to a policy counter for one or more reference network policies. The SLR command may specify multiple subject policy counter identifiers. In step 304, the OCS selects an ongoing Sy session, and in step 306, the OCS checks whether the reference policy counter is included in the session list for the selected Sy session. In the case of multiple reference network policies, the OCS checks a Condition AVP to determine whether application of the SLR command is for Sy sessions which already include a subscription to at least one of reference policy counters or is for SY sessions which already include a subscription to all of the reference policy counters. If a, the or all reference policy counter or counters is/are not in the session list, then the OCS makes no change to the session list at step 308 and proceeds to check whether or not all Sy sessions have been considered at step 310. If all ongoing Sy sessions have not yet been considered, the OCS returns to step 306 and selects a new Sy session.

Returning to step 306, if a, the or all reference policy counter or counters is/are present in the selected Sy session list, the OCS proceeds to check at step 312 whether the subject policy counter identifier from the SLR command is already in the list for the currently selected Sy session. If the subject policy counter identifier is not in the list, the OCS first checks whether the received SLR command specifies addition or removal of the subject policy counter by checking the value of an Action Type AVP from the SLR command in step 320. If the SLR command specifies addition via an Action Type value of 0—subscribe, then the OCS adds the policy counter identifier to the list at step 322. If the SLR command specifies removal via an Action Type value of 1—un-subscribe, then the OCS makes no change to the list at step 308. Returning to step 312, if the subject policy counter identifier is already in the list, then the OCS again checks whether the SLR command specifies addition or removal of the subject policy counter identifier by checking the value of an Action Type AVP from the SLR command in step 314. If the SLR command specifies addition via an Action Type value of 0—subscribe, then no change is made to the list at step 316. If the SLR command specifies removal via an Action Type value of 1—un-subscribe, then the OCS removes the subject policy counter from the session list at step 318. The effect of these steps for an SLR command specifying addition is thus to add any and all of the subject policy counter identifiers received with the SLR command which are not already present in an applicable ongoing Sy session list to the Sy session list, while leaving other list entries unchanged. The effect of these steps for an SLR command specifying removal is to remove any and all of the subject policy counter identifiers received with the SLR command which are present in an applicable ongoing Sy session list from the Sy session list, while leaving other list entries unchanged. As described above, an applicable Sy session is an Sy session including a subscription to a, the or all reference network policy counter or counters.

Following updating of the session list in steps 322 or 318, or making no change to the session list in steps 308 or 316, the OCS checks whether all ongoing Sy sessions have been updated in step 324. As discussed above, if all ongoing Sy sessions have not yet been updated, the OCS returns to step 304 to select a new Sy session. When all ongoing Sy sessions have been updated, the OCS sends a Spending Limit Answer in step 324, confirming that the SLR command received in step 302 has been applied to all ongoing Sy sessions which already included a subscription to a policy counter for the a, the or all reference network policy or policies, according to the instructions received in the SLR command. The process then terminates at step 326.

It will be appreciated that some of the above described steps may be performed in a different order to that described. For example the checks on whether the SLR command specifies addition or removal of a subject policy counter identifier, and whether the subject policy counter identifier is present in an Sy session list, may be performed in the reverse order.

Figure 4:
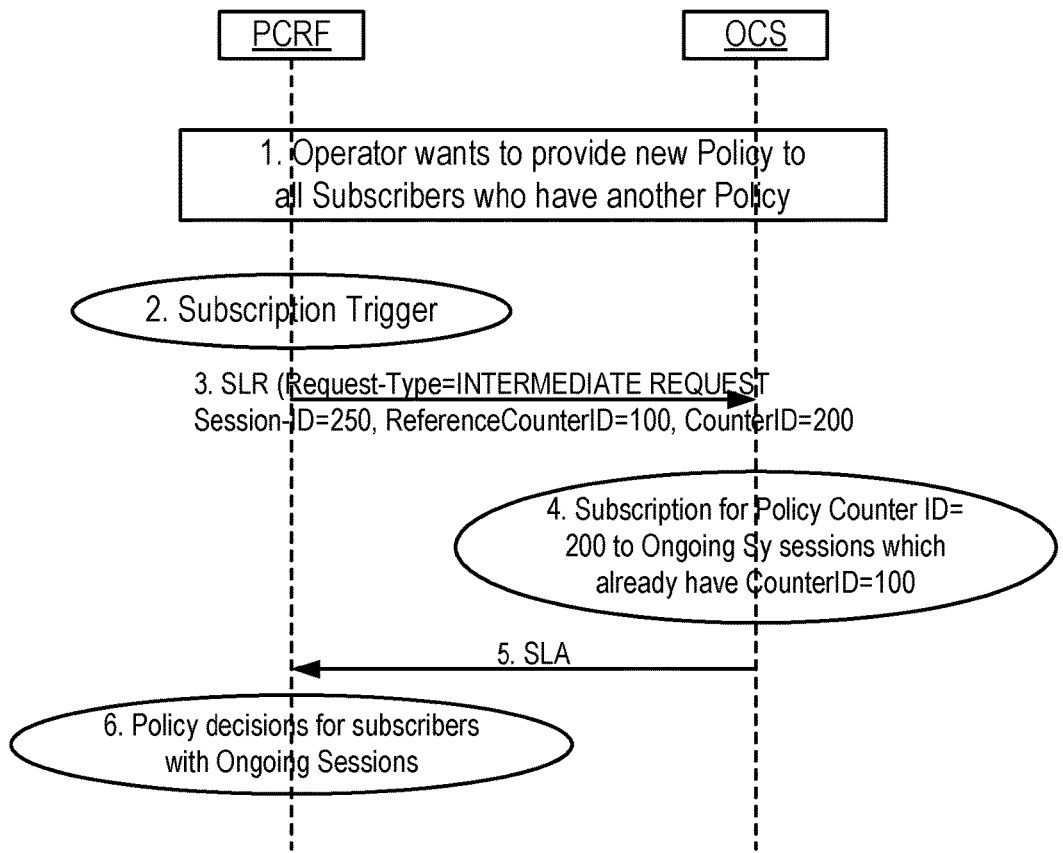
FIGS. 4 and 5 illustrate command flows between a PCRF and an OCS.
Figure 5:
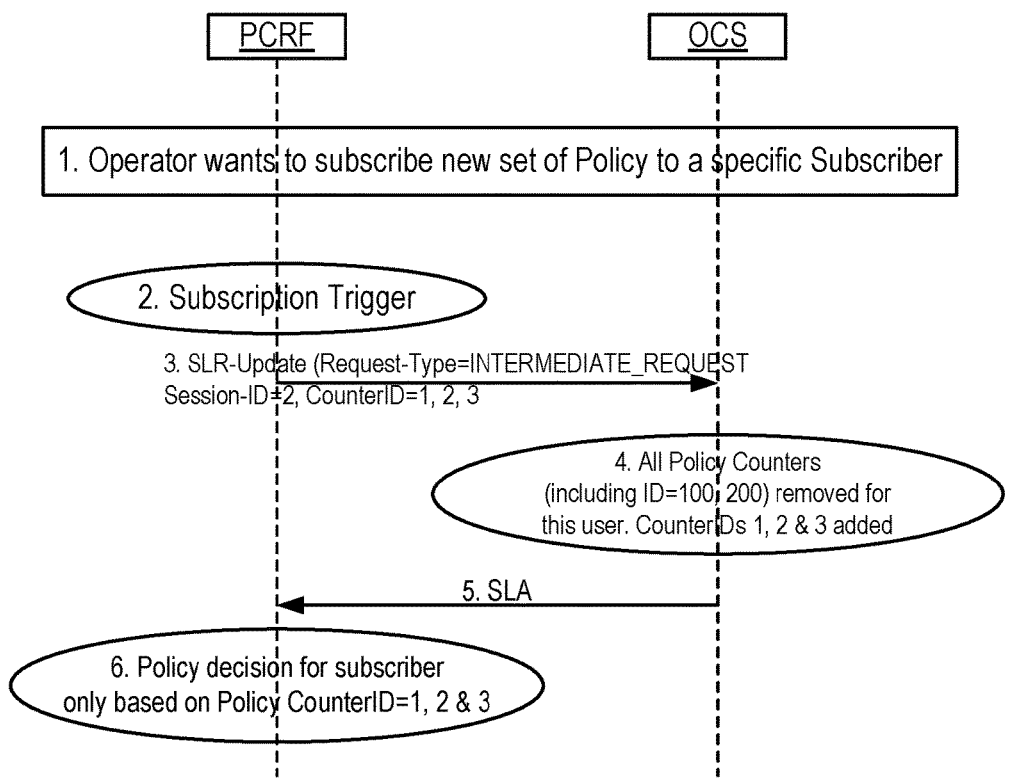

FIGS. 4 and 5 illustrate command flow between a PCRF and OCS for an Intermediate SLR command applying to multiple users and an Intermediate SLR command applying to a single user.

Referring to FIG. 4, a scenario is illustrated in which an operator wishes to provide a certain Policy, illustrated as subject Policy Counter Identifier 200, to all Users who already have a reference policy, illustrated as reference Policy Counter Identifier 100. This is shown in FIG. 4 as stage 1. The provisioning of the subject Policy Counter at the PCRF and OCS is conducted according to the current standards. In stage 2 a Spending Limit Request Report procedure for multiple ongoing sessions is triggered at the PCRF for the subscription of Policy Counter Identifier 200 for all users having a subscription to Policy Counter 100. This new trigger enables the PCRF to distinguish between triggering of an individual User Spending Limit Request Procedure and triggering of a Multiple Users Spending Limit Request Procedure. In stage 3, the PCRF sends an SLR Command to the OCS with SL-Request-Type INTERMEDIATE_REQUEST. Included in the SLR command are the reference Policy Counter Identifier 100 and the subject Policy Counter Identifier 200. Also included Is an Action Type AVP (not shown) set to 0—subscribe and indicating that the subject Policy Counter Identifier should be added to the appropriate Sy sessions. In stage 4, upon receipt of the SLR command with SL-Request-Type INTERMEDIATE_REQUEST, the OCS identifies the Sy sessions of Users who already have a subscription to the Reference Policy Counter Identifier 100. For the identified Sy sessions, the OCS then acts upon the Policy Counter Identifier 200 as if it had been received per user in a series of individual Intermediate requests, adding the Policy Counter Identifier 200 to all identified ongoing Sy sessions in which it does not already appear. In stage 5, the OCS sends a Spending Limit Answer to PCRF. In stage 6, the PCRF acts upon the Policy Counter Identifier 200 for all ongoing sessions which already had a subscription to reference Policy Counter Identifier 100 as if it had subscribed to the subject Policy Counter Identifier 200 using multiple individual Intermediate requests, one for each of the affected ongoing sessions.

It will be appreciated that removal of a particular subject policy counter for all users having an existing subscription to a reference policy counter may be achieved with minor amendment of the above process flow, in accordance with the methods 200, 300 described above.

FIG. 5 illustrates a situation in which the operator wishes to subscribe to a set of Policy Counters for an individual user for whom an Sy session is ongoing. This is illustrated as stage 1 and takes place after completion of the command flow illustrated in FIG. 4. Individual user subscription and un-subscription is unaffected by the introduction of the new methods according to aspects of the invention, and proceeds using an Intermediate request according to the current standards. In stage 2, the Spending Limit Request Report procedure for the individual user is triggered at the PCRF for the un-subscription of earlier Policy Counter Identifiers and subscription to new Policy Counter Identifiers. In stage 3, an SLR command is sent to the OCS with SL-Request-Type INTERMEDIATE_REQUEST and identifying Policy Counter Identifiers 1, 2 and 3. It will be noted that as the process flow applies to a single subscriber, a reference Policy Counter identifier is not included in the SLR command. In stage 4, upon receipt of the SLR command, the OCS acts upon earlier subscribed Policy Counter Identifiers for the user, including the Policy Counter Identifiers 100 and 200. The existing Policy Counter Identifier list for the User, including Policy Counter Identifiers 100 and 200, is replaced with the new Policy Counter Identifiers 1, 2 and 3 included in the Intermediate request. Policy Counter Identifiers 100 and 200 are thus un-subscribed, together with all other existing Policy Counter Identifiers in the User's list. In stage 5, a Spending Limit Answer is sent back to PCRF and in stage 6 the PCRF updates its internal record for the User accordingly.

Figure 6:
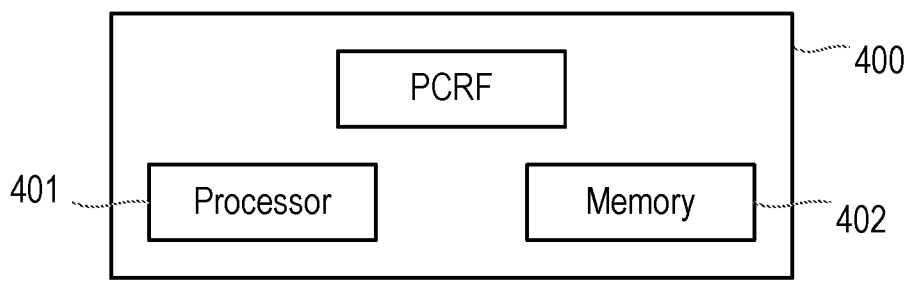
FIG. 6 is a block diagram illustrating functional units in a PCRF.
Figure 7:
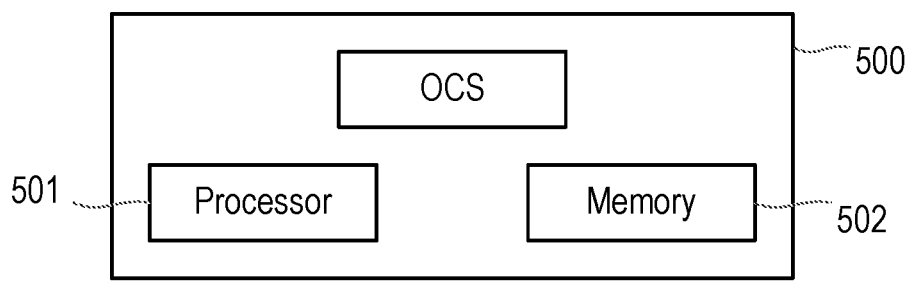
FIG. 7 is a block diagram illustrating functional units in an OCS.

The methods of the present invention, as illustrated by the above examples and command flows, may be conducted in a PCRF or OCS. The methods may be conducted on receipt of suitable computer readable instructions, which may be embodied within a computer program running on the PCRF or OCS. FIGS. 6 and 7 illustrate first examples of PCRF and OCS which may execute the methods of the present invention, for example on receipt of suitable instructions from a computer program. Referring to FIGS. 6 and 7, each of the PCRF 400 and OCS 500 comprises a processor 401, 501, and a memory 402, 502. The memory 402, 502 contains instructions executable by the processor 401, 501 such that the PCRF 400 is operative to carry out examples of the method 200, and the OCS 500 is operative to carry out examples of the method 300.

Figure 8:
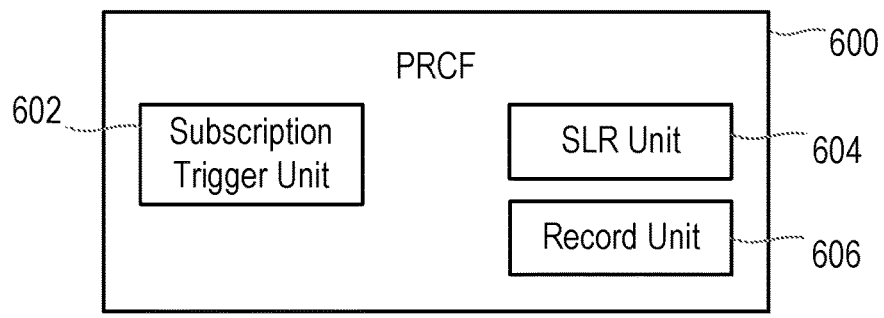
FIG. 8 is a block diagram illustrating functional units in another example of PCRF.

FIG. 8 illustrates functional units in another embodiment of PCRF 600 which may execute the method 200, for example according to computer readable instructions received from a computer program. It will be understood that the units illustrated in FIG. 8 are functional units, and may be realised in any appropriate combination of hardware and/or software. The units may comprise one or more processors and one or more memories and may be integrated to any degree.

Referring to FIG. 8, the PCRF 600 comprises a subscription trigger unit 602 configured to receive a Multiple Users subscription trigger from a network operator, the Multiple Users subscription trigger identifying a reference network policy and a subject network policy. The PCRF 600 further comprises a Spending Limit Request unit 604 configured to send a Spending Limit Request (SLR) command to an OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy. The Spending Limit Request unit 604 may be further configured to receive a Spending Limit Answer (SLA) from the OCS, the SLA confirming application of the SLR command with respect to the subject policy counter to all ongoing Sy sessions between the PCRF and the OCS which already included a subscription to a policy counter for the reference network policy.

The Multiple Users subscription trigger may identify a plurality of reference network policies. The addition or removal of a subject policy or policies for users may be dependent upon an exiting subscription to one or more of the reference polices. The Multiple Users subscription trigger may specify whether the trigger applies to users having an existing subscription to any one of the reference policies or to users having an existing subscription to all of the reference policies. In such examples, the Spending Limit Request unit 604 may be configured to send an SLR command specifying a plurality of reference policies.

The PCRF 600 may further comprise a record unit 606 configured to update an internal record for each ongoing Sy session between the PCRF and the OCS including a subscription to a policy counter for the reference network policy with application of the SLR command with respect to the subject policy counter. The record unit 606 may be configured to update an internal record for each ongoing Sy session between the PCRF and the OCS including a subscription to a policy counter for the reference network policy with application of the SLR command with respect to the subject policy counter by, for each ongoing Sy session between the PCRF and the OCS including a subscription to a policy counter for the reference network policy, performing one of adding or removing the policy counter identifier of the subject policy counter to or from a list of policy counter identifiers for which the PCRF will receive status update notifications from the OCS for that Sy session.

The Spending Limit Request unit 604 may be configured to specify application of the SLR command with respect to the subject policy counter to all ongoing Sy sessions between the PCRF and the OCS which already include a subscription to a policy counter for the reference network policy by setting a Spending Limit Request Type Attribute Value Pair (AVP) of the SLR command to INTERMEDIATE_REQUEST, including a Reference Policy Counter Identifier AVP in the SLR command, and setting the Reference Policy Counter Identifier AVP to be an identifier of the policy counter for the reference network policy.

The Spending Limit Request unit 604 may be further configured to specify application of the SLR command with respect to the subject policy counter to all ongoing Sy sessions between the PCRF and the OCS which already include a subscription to a policy counter for the reference network policy by specifying one of addition or removal of the subject policy counter for the subject network policy. In some examples, the Spending Limit Request unit 604 may be configured to specify addition of the subject policy counter by including an Action Type AVP in the SLR command and setting a value of the Action Type AVP to subscribe. The Spending Limit Request unit 604 may be configured to specify removal of the subject policy counter by including an Action Type AVP in the SLR command and setting a value of the Action Type AVP to unsubscribe.

The subscription trigger unit 602 may be configured to receive a Multiple Users subscription trigger specifying one of provision or removal of the subject network policy. If the Multiple Users subscription trigger specifies provision of the identified network policy, the Spending Limit Request unit 604 may be configured to specify application of the SLR command with respect to the subject policy counter to all ongoing Sy sessions between the PCRF and the OCS which already include a subscription to a policy counter for the reference network policy by specifying addition of the subject policy counter for the subject network policy. If the Multiple Users subscription trigger specifies removal of the identified network policy, the Spending Limit Request unit 604 may be configured to specify application of the SLR command with respect to the subject policy counter to all ongoing Sy sessions between the PCRF and the OCS which already include a subscription to a policy counter for the reference network policy by specifying removal of the subject policy counter for the subject network policy.

If the Multiple Users subscription trigger identifies a plurality of reference network policies, the Spending Limit Request unit 604 may be configured to specify application of the SLR command with respect to the subject policy counter to all ongoing Sy sessions between the PCRF and the OCS which already include a subscription to a policy counter for the reference network policy by including identifiers for the plurality of reference network policies in the SLR command and including a Condition AVP in the SLR command, and setting a value of the Condition AVP to at least one of AND or OR.

Figure 9:
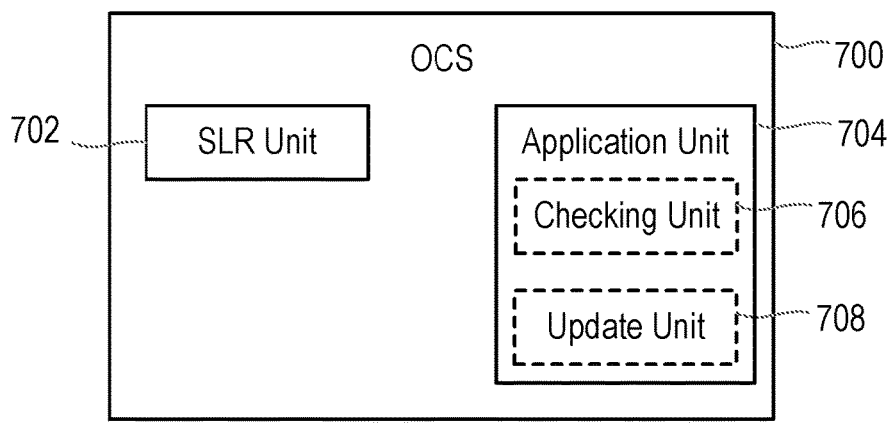
FIG. 9 is a block diagram illustrating functional units in another example of OCS.

FIG. 9 illustrates functional units in another embodiment of OCS 700 which may execute the method 300, for example according to computer readable instructions received from a computer program. It will be understood that the units illustrated in FIG. 9 are functional units, and may be realised in any appropriate combination of hardware and/or software. The units may comprise one or more processors and one or more memories and may be integrated to any degree.

Referring to FIG. 9, the OCS 700 comprises a Spending Limit Request unit 702 configured to receive an SLR command from a PCRF, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy. The OCS 700 further comprises an application unit 704 configured to apply the received SLR command with respect to the subject policy counter to each ongoing Sy session between the OCS and the PCRF which already includes a subscription to a policy counter for the reference network policy.

The Spending Limit Request unit 702 may be further configured to send a Spending Limit Answer (SLA) to the PCRF, the SLA confirming application of the SLR with respect to the subject policy counter to all ongoing Sy sessions between the PCRF and the OCS which already included a subscription to a policy counter for the reference network policy.

The Spending Limit Request unit 702 may be configured to receive an SLR command in which a Spending Limit Request Type Attribute Value Pair (AVP) of the SLR command is set to INTERMEDIATE_REQUEST, the SLR command including a Reference Policy Counter Identifier AVP, and in which the Reference Policy Counter Identifier AVP is set to be an identifier of the policy counter for the reference network policy.

The application unit 704 may comprise a checking unit 706 and an updating unit 708 and, for each ongoing Sy session between the OCS and the PCRF, the checking unit 706 may be configured to check whether the reference policy counter identifier is present in an Sy session list of policy counter identifiers for which status update notifications are to be sent to the PCRF for that Sy session. If the reference policy counter identifier is present in the Sy session list, the updating unit 708 may be configured to perform one of adding or removing the subject policy counter identifier to or from the Sy session list, and if the reference policy counter identifier is not present in the Sy session list, the updating unit 708 may be configured to make no change to the Sy session list.

The application unit 704 may be further configured to check a value of an Action Type AVP in the SLR command.

The SLR command may specify policy counters for a plurality of reference network policies, and may specify a condition for application of the SLR command, the condition being a subscription to at least one or to all of the specified reference network policies. The condition may be specified via a Condition AVP. In such examples, the application unit 704 may be further configured to check a condition for application of the SLR command, and the checking unit 706 may be configured to check whether any one or all of the reference policy counter identifiers are present in an Sy session list of policy counter identifiers for which status update notifications are to be sent to the PCRF for that Sy session.

If the Spending Limit Request Unit 702 receives an SLR command specifying addition of the subject policy counter for the subject network policy; for each ongoing Sy session between the OCS and the PCRF, if the reference policy counter identifier is present in the Sy session list, the checking unit 706 may be further configured to check whether the subject policy counter identifier is already present in the Sy session list. If the subject policy counter identifier is already present in the Sy session list, the updating unit 708 may be configured to make no change to the list, and if the subject policy counter identifier is not already present in the Sy session list, the updating unit 708 may be configured to add the subject policy counter identifier to the Sy session list.

If the Spending Limit Request Unit 702 receives an SLR command specifying removal of the subject policy counter for the subject network policy; for each ongoing Sy session between the OCS and the PCRF, if the reference policy counter identifier is present in the Sy session list, the checking unit 706 may be further configured to check whether the subject policy counter identifier is present in the Sy session list. If the subject policy counter identifier is present in the Sy session list, the updating unit 708 may be configured to remove the subject policy counter identifier from the list, and if the subject policy counter identifier is not present in the Sy session list, the updating unit 708 may be configured to make no change to the list.

Aspects of the present invention thus provide methods and apparatus for managing subscription by a PCRF to policy counters maintained at an OCS. The methods and apparatus enable multiple subscription to or un-subscription from one or more policy counters for all ongoing sessions between the PCRF and OCS which already include a subscription to one or more reference policy counter or counters in a single SLR command. The methods and apparatus disclosed herein thus avoid the signalling burst that is otherwise caused when a network policy is applied to or removed from a group of network users. The methods described herein are backwards compatible in that they do not impact existing communication protocol between a PCRF and OCS for Initial, Intermediate or Final SLR requests. In addition, the SLR messages introduced according to examples of the present disclosure are mapped to existing Sy sessions, enabling the PCRF and OCS to manage the messages, and to monitor and report policy counters in a manner consistent with existing standard documents.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed in a Policy and Charging Rules Function (PCRF), for managing subscription to policy counters maintained at an Online Charging System (OCS), wherein the PCRF is operable to communicate with the OCS over an Sy reference point, the method comprising:

receiving a Multiple Users subscription trigger from a network operator, the Multiple Users subscription trigger identifying a reference network policy and a subject network policy; and sending a Spending Limit Request (SLR) command to the OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy.

2. The method of claim 1, further comprising receiving a Spending Limit Answer (SLA) from the OCS, the SLA confirming application of the SLR command with respect to the subject policy counter to all ongoing Sy sessions between the PCRF and the OCS which already include a subscription to a policy counter for the reference network policy.

3. The method of claim 1, further comprising updating an internal record for each ongoing Sy session between the PCRF and the OCS including a subscription to a policy counter for the reference network policy with application of the SLR command with respect to the subject policy counter.

4. The method of claim 3, wherein updating an internal record for each ongoing Sy session between the PCRF and the OCS including a subscription to a policy counter for the reference network policy with application of the SLR command with respect to the subject policy counter comprises:

for each ongoing Sy session between the PCRF and the OCS including a subscription to a policy counter for the reference network policy, performing one of adding or removing the identifier of the subject policy counter to or from a list of policy counter identifiers for which the PCRF will receive status update notifications from the OCS for that Sy session.

5. The method of claim 1, wherein specifying application of the SLR command with respect to the subject policy counter to all ongoing Sy sessions between the PCRF and the OCS which already include a subscription to a policy counter for the reference network policy comprises:

setting a Spending Limit Request Type Attribute Value Pair (AVP) of the SLR command to INTERMEDIATE_REQUEST;

including a Reference Policy Counter Identifier AVP in the SLR command; and setting the Reference Policy Counter Identifier AVP to be an identifier of the policy counter for the reference network policy.

6. The method of claim 1, wherein specifying application of the SLR command with respect to the subject policy counter to all ongoing Sy sessions between the PCRF and the OCS which already include a subscription to a policy counter for the reference network policy comprises specifying one of addition or removal of the subject policy counter for the subject network policy.

7. The method of claim 1, wherein the Multiple Users subscription trigger specifies one of provision or removal of the subject network policy, and wherein:

if the Multiple Users subscription trigger specifies provision of the subject network policy, specifying application of the SLR command with respect to the subject policy counter to all ongoing Sy sessions between the PCRF and the OCS which already include a subscription to a policy counter for the reference network policy comprises specifying addition of the subject policy counter for the subject network policy, and if the Multiple Users subscription trigger specifies removal of the identified network policy, specifying application of the SLR command with respect to the subject policy counter to all ongoing Sy sessions between the PCRF and the OCS which already include a subscription to a policy counter for the reference network policy comprises specifying removal of the subject policy counter for the subject network policy.

8. A method, performed in an Online Charging System (OCS) for managing subscription by a Policy and Charging Rules Function (PCRF) to policy counters maintained at the OCS, wherein the OCS is operable to communicate with the PCRF over an Sy reference point, the method comprising:

receiving a Spending Limit Request (SLR) command from the PCRF, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy; and applying the received SLR command with respect to the subject policy counter to each ongoing Sy session between the OCS and the PCRF which already includes a subscription to a policy counter for the reference network policy.

9. The method of claim 8, further comprising sending a Spending Limit Answer (SLA) to the PCRF, the SLA confirming application of the SLR with respect to the subject policy counter to all ongoing Sy sessions between the PCRF and the OCS which already included a subscription to a policy counter for the reference network policy.

10. The method of claim 8, wherein a Spending Limit Request Type Attribute Value Pair (AVP) of the SLR command is set to INTERMEDIATE_REQUEST, wherein the SLR command includes a Reference Policy Counter Identifier AVP, and wherein the Reference Policy Counter Identifier AVP is set to be an identifier of the policy counter for the reference network policy.

11. The method of claim 8, wherein applying the received SLR command with respect to the subject policy counter to each ongoing Sy session between the OCS and the PCRF which already includes a subscription to a policy counter for the reference network policy comprises:

for each ongoing Sy session between the OCS and the PCRF, checking whether the reference policy counter identifier is present in an Sy session list of policy counter identifiers for which status update notifications are to be sent to the PCRF for that Sy session; and if the reference policy counter identifier is present in the Sy session list, performing one of adding or removing the subject policy counter identifier to or from the Sy session list, and if the reference policy counter identifier is not present in the Sy session list, making no change to the Sy session list.

12. The method of claim 11, further comprising, if the SLR command specifies addition of the subject policy counter for the subject network policy:

for each ongoing Sy session between the OCS and the PCRF, if the reference policy counter identifier is present in the Sy session list, checking whether the subject policy counter identifier is already present in the Sy session list; and if the subject policy counter identifier is already present in the Sy session list, making no change to the list, and if the subject policy counter identifier is not already present in the Sy session list, adding the subject policy counter identifier to the Sy session list.

13. The method of claim 11, further comprising, if the SLR command specifies removal of the subject policy counter for the subject network policy:

for each ongoing Sy session between the OCS and the PCRF, if the reference policy counter identifier is present in the Sy session list, checking whether the subject policy counter identifier is present in the Sy session list; and if the subject policy counter identifier is present in the Sy session list, removing the subject policy counter identifier; and if the subject policy counter identifier is not present in the Sy session list, making no change to the list.

14. A Policy and Charging Rules Function (PCRF) for managing subscription to policy counters maintained at an Online Charging System (OCS) wherein the PCRF is operable to communicate with the OCS over an Sy reference point, the PCRF comprising a processor and a memory, the memory containing instructions executable by the processor such that the PCRF is operable to:

receive a Multiple Users subscription trigger from a network operator, the Multiple Users subscription trigger identifying a reference network policy and a subject network policy; and send a Spending Limit Request (SLR) command to the OCS, the SLR command specifying an identifier of a subject policy counter for the subject network policy and specifying application of the SLR command with respect to the subject policy counter to all ongoing Sy sessions between the PCRF and the OCS which already include a subscription to a policy counter for the reference network policy.

15. An Online Charging System (OCS) for managing subscription by a Policy and Charging Rules Function (PCRF) to policy counters maintained at the OCS, wherein the OCS is operable to communicate with the PCRF over an Sy reference point, the OCS comprising a processor and a memory, the memory containing instructions executable by the processor such that the OCS is operable to:

receive a Spending Limit Request (SLR) command from the PCRF, the SLR command specifying an identifier of a subject policy counter for a subject network policy and specifying application of the SLR command with respect to the subject policy counter to all ongoing Sy sessions between the PCRF and the OCS which already include a subscription to a policy counter for a reference network policy; and apply the received SLR command with respect to the subject policy counter to each ongoing Sy session between the OCS and the PCRF which already includes a subscription to a policy counter for the reference network policy.

* * * * *